US008258436B2

(12) United States Patent
Nishitani et al.

(10) Patent No.: US 8,258,436 B2
(45) Date of Patent: Sep. 4, 2012

(54) HEATING DEVICE

(75) Inventors: Hisahiro Nishitani, Nara (JP); Kouji Kanzaki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/989,491

(22) PCT Filed: Apr. 24, 2009

(86) PCT No.: PCT/JP2009/001884

§ 371 (c)(1),
(2), (4) Date: Oct. 25, 2010

(87) PCT Pub. No.: WO2009/133681

PCT Pub. Date: Nov. 5, 2009

(65) Prior Publication Data

US 2011/0036825 A1 Feb. 17, 2011

(30) Foreign Application Priority Data

Apr. 28, 2008 (JP) ................................ 2008-116822

(51) Int. Cl.
*A21B 1/00* (2006.01)
*F24C 15/32* (2006.01)

(52) U.S. Cl. ........ 219/400; 219/396; 219/397; 219/398; 219/403; 219/386; 126/21 A; 126/21 R

(58) Field of Classification Search .................. 219/400, 219/386, 395, 403, 396, 397, 398; 126/21 A, 126/21 R
See application file for complete search history.

(56) References Cited

U.S. PATENT DOCUMENTS 6,472,647 B2 10/2002 Lee et al.

FOREIGN PATENT DOCUMENTS

| | | | | |
|---|---|---|---|---|
| CN | 1356501 | A | | 7/2002 |
| JP | 5-74568 | | * | 3/1993 |
| JP | 05-074568 | A | | 3/1993 |
| JP | 05-090209 | U | | 12/1993 |
| JP | 07-119973 | A | | 5/1995 |
| JP | 2002-71141 | | * | 3/2002 |
| JP | 2002-071141 | A | | 3/2002 |
| JP | 2009-127900 | A | | 6/2009 |

OTHER PUBLICATIONS

International Search Report for International Application No. PCT/JP2009/001884, dated Jul. 21, 2009, 2 pages.

* cited by examiner

*Primary Examiner* — Shawntina Fuqua
(74) *Attorney, Agent, or Firm* — Brinks Hofer Gilson & Lione

(57) ABSTRACT

The present invention provides a heating device including a heating compartment for holding an object-to-be-heated, an oven heater for heating the heating compartment, a circulation fan for supplying the heat of the oven heater to the heating compartment as hot air, a drive motor for driving the circulation fan, a grill heater in an upper part of the heating compartment, and a turntable on which the object-to-be-heated is mounted, the turntable being in the bottom of the heating compartment, in which the grill heater is disposed obliquely to a side surface of the heating compartment in a part of the upper part of the heating compartment.

6 Claims, 4 Drawing Sheets

HEATING DEVICE

This application is a 371 application of PCT/JP2009/001884 having an international filing date of Apr. 24, 2009, which claims priority to JP2008-116822 filed on Apr. 28, 2008, the entire contents of which are incorporated herein by reference.

TECHNICAL FIELD

The present invention relates to a heater, and more particularly to a heating device for heating an object by a high frequency.

BACKGROUND ART

Conventionally, in this kind of heating device, grill heaters are disposed in an upper part of a heating compartment, and specifically in a plurality in a rectangular heating compartment, so that the radiation heat may be radiated nearly to the entire area of the heating compartment (see, for example, patent literature 1).

FIG. 4 is a sectional view of a conventional heating device disclosed in patent literature 1. As shown in FIG. 4, the heating device is composed of main body 51, heating compartment 52, circulation fan 58, oven heater 59, drive motor 63, and grill heater 70.

In the conventional configuration, however, in order to heat the object, the entire heating compartment must be heated almost uniformly in order to heat the object uniformly. Accordingly, a multiplicity of grill heaters were disposed in a wide range in the upper part of the heating compartment. As a result, the oven heater and the circulation fan must be disposed in a side wall part or rear wall part of the heating compartment. Hence, the heating device becomes large in size, and it cannot be installed on a narrow counter, or the cooking space in the kitchen or cookroom is narrowed.

Patent literature 1: Unexamined Japanese Patent Publication No. H7-119973

SUMMARY OF THE INVENTION

The heating device of the present invention includes a heating compartment for holding an object-to-be-heated, an oven heater for heating the heating compartment, a circulation fan for supplying the heat of the oven heater to the heating compartment as hot air, a drive motor for driving the circulation fan, a grill heater in an upper part of the heating compartment, and a turntable on which the object-to-be-heated is mounted, the turntable being in the bottom of the heating compartment, in which the grill heater is disposed obliquely to a side surface of the heating compartment in a part of the upper part of the heating compartment.

In the heating device having such configuration, the installation space of the grill heater is reduced, and the oven heater and the circulation fan can be disposed in an empty space in the upper part of the heating compartment, so that the entire heating device can be reduced in size. As a result, it is easily installed on a counter, and the cooking space in the kitchen or cookroom is widened.

DETAILED DESCRIPTION OF THE PREFERRED EMBODIMENTS

Preferred embodiments of the present invention are described below by reference to the accompanying drawings. It must be noted, however, that the present invention is not limited to the illustrated preferred embodiments alone.

Preferred Embodiment 1

Figure 1:
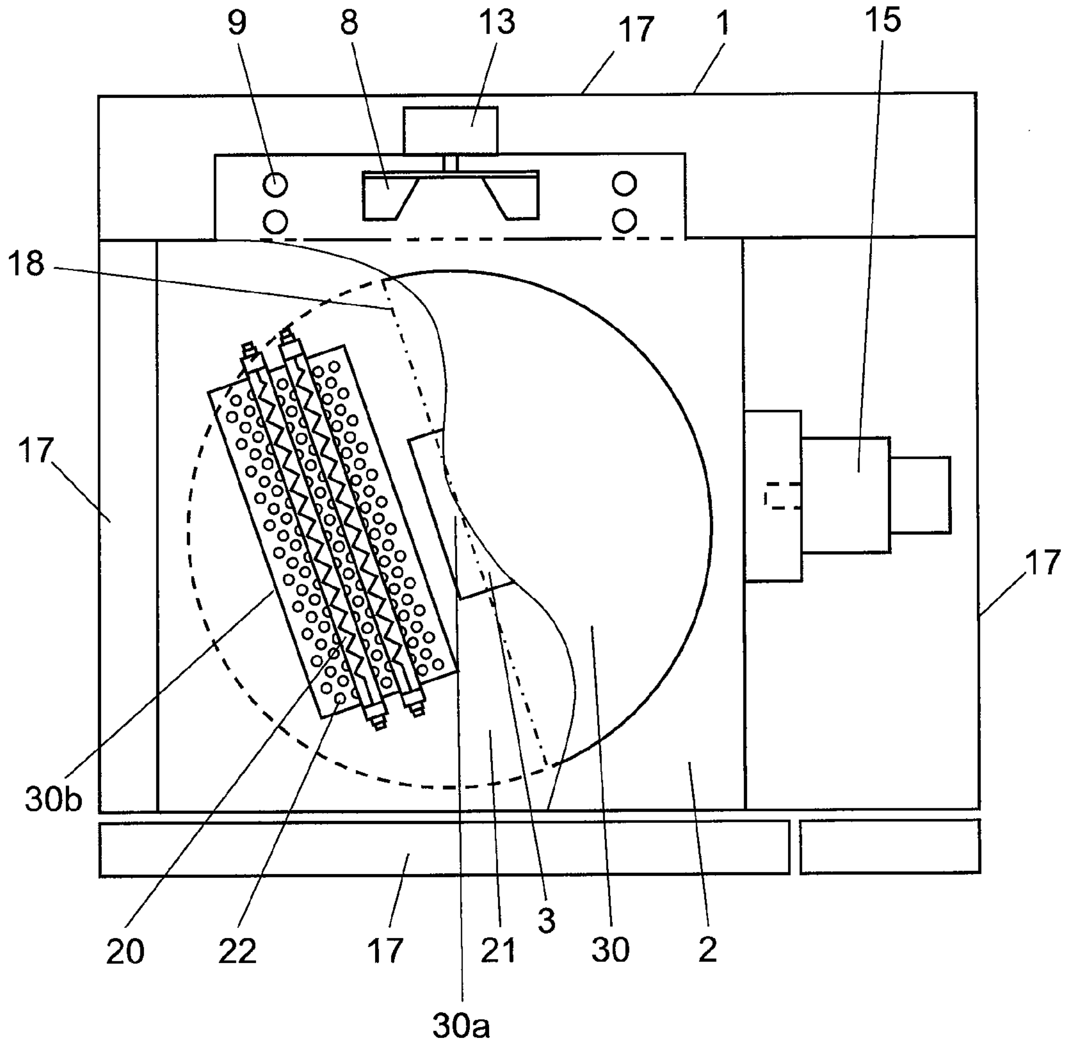
FIG. 1 is a sectional view of essential parts of an upper part of a heating device in preferred embodiment 1 of the present invention.

FIG. 1 is a sectional view of essential parts of an upper part of a heating device in preferred embodiment 1 of the present invention.

Heating device main body 1 includes heating compartment 2, oven heater 9, circulation fan 8, drive motor 13, grill heater 20, and turntable 30. Herein, object-to-be-heated 3 is a food, which is contained in heating compartment 2. Heating compartment 2 is heated by oven heater 9. Circulation fan 8 supplies the heat of oven heater 9 to heating compartment 2 as hot air. Drive motor 8 drives circulation fan 8. In an upper part of heating compartment 2, grill heater 20 is positioned, an in a bottom part of heating compartment 2, turntable 30 on which the food is placed is positioned.

Grill heater 20 is disposed obliquely to side surface 17 of heating compartment 2 in a part of the upper part of heating compartment 2. More specifically, grill heater 20 is preferably disposed in parallel to diameter 18 of turntable 30. As a result, grill heater 20 and high-frequency oscillator 15 are combined to compose a heating device capable of heating object-to-be-heated 3 by radiation heat, convection heat, and high-frequency energy.

In the heating device having such configuration, the operation and the action are explained below.

First of all, the heat generated in oven heater 9 is blown into the inside of heating compartment 2 by way of circulation fan 8. Herein, circulation fan 8 is rotated at high speed by means of drive motor 13. The heat generated in oven heater 9 is supplied to heat object-to-be-heated 3, and is sucked into the center of circulation fan 8, and is blown out into the inside of heating compartment 2. The heating device in preferred embodiment 1 of the present invention composes such hot air circulation system.

The radiation heat radiated from grill heater 20 is radiated into the inside of heating compartment 2 by way of radiation hole 22 provided in heating compartment upper wall 21, and heats object-to-be-heated 3. Turntable 30 on which object-to-be-heated 3 is placed is put into rotation, and the entire surface of object-to-be-heated 3 is heated uniformly if grill heater 20 is disposed obliquely in a part of the upper part of heating compartment 2.

In this manner, in preferred embodiment 1 of the present invention, by rotation of turntable 30 on which object-to-be-heated 3 is placed, if grill heater 20 is disposed obliquely in a part of the upper part of heating compartment 2, object-to-be-heated 3 can be heated entirely and uniformly. Accordingly, object-to-be-heated 3 can be heated entirely and uniformly without disposing a multiplicity of grill heaters 20 in a wide range in the upper part of heating compartment 2.

In addition, high-frequency oscillator 15 for supplying a high frequency is provided in heating compartment 2. Accordingly, as the device for heating object-to-be-heated 3, the high frequency can be utilized at the same time, in addition to oven heater 9 and grill heater 20. Herein, as the high frequency to be supplied to high-frequency oscillator 15, the electric power generating by saving the number of grill heaters 20 can be utilized. As a result, the heating device is compounded, and object-to-be-heated 3 can be heated more rapidly, and a cooking method making use of features of various heating devices can be presented.

In preferred embodiment 1 of the present invention, in the meantime, a part of grill heaters 20 is not disposed above central area 30*a* of turntable 30. That is, grill heater 20 is disposed above peripheral part 30*b* of turntable 30.

Therefore, when turntable 30 is put in rotation, the central portion of object-to-be-heated 3 is prevented from being heated more intensively than the peripheral area. If desired to heat the central portion of object-to-be-heated 3 more intensively, a part of grill heater 20 may be disposed above central area 30*a* of turntable 30, so that object-to-be-heated 3 in central area 30*a* of turntable 30 may be heated intensively. As a result, when turntable 30 is put in rotation, the central area may be heated more intensively than the peripheral area of object-to-be-heated 3.

It means, whether to heat the central area of object-to-be-heated 3 intensively, or to heat uniformly, it can be selected by the manner of disposing grill heater 20 depending on the application or the purpose.

Alternatively, grill heater 20 may be disposed outside of heating compartment 2, and a plurality of radiation holes 22 for radiating the heat of grill heater 20 into the inside of heating compartment 2 may be provided in heating compartment upper wall 21. Radiation holes 22 are disposed in a same direction as the longitudinal direction of grill heater 20, and obliquely on heating compartment upper wall 21. As a result, unlike the prior art, radiation holes 22 may not be provided nearly on the entire surface of heating compartment upper wall 21, and lowering of strength of heating compartment upper wall 21 can be prevented.

Since the number of radiation holes 22 may be saved, the hot air in heating compartment 2 is prevented from moving away from heating compartment 2, and the heat insulation performance of heating compartment 2 is increased, and the heat efficiency is enhanced.

Preferred Embodiment 2

Figure 2:
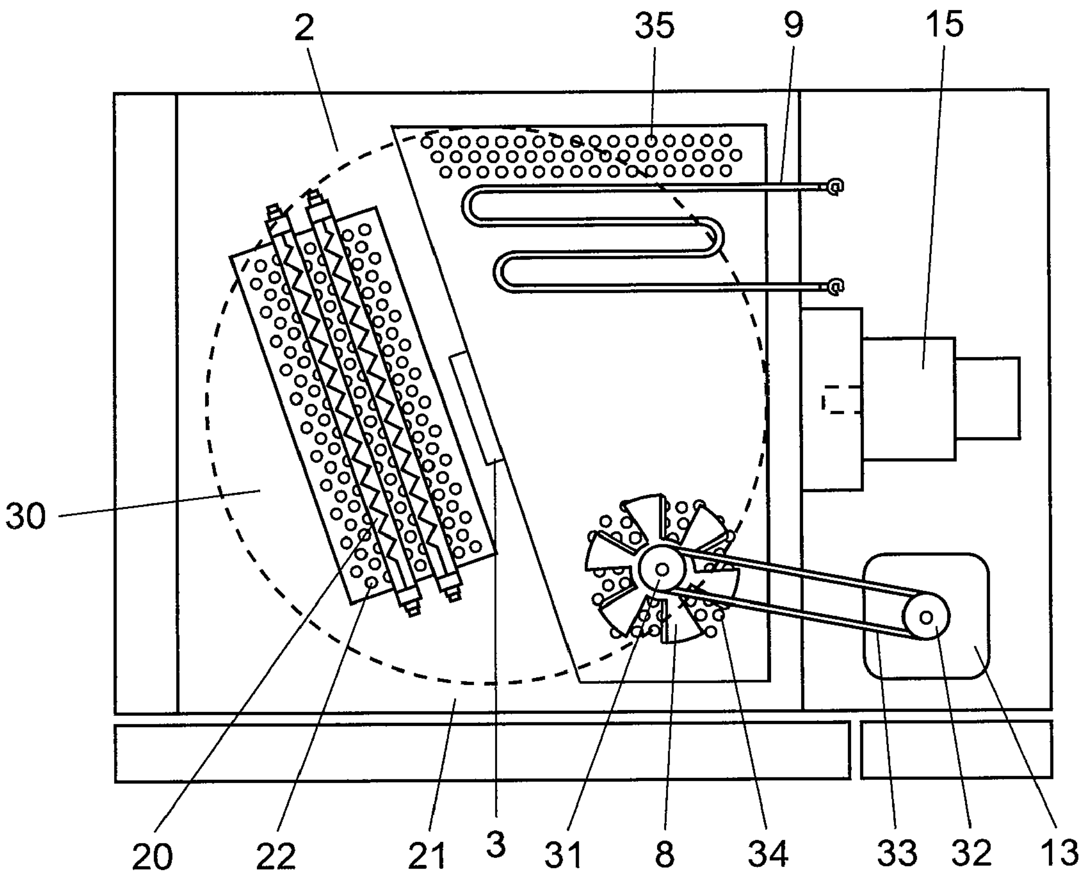
FIG. 2 is a top view of a heating device in preferred embodiment 2 of the present invention.
Figure 3:
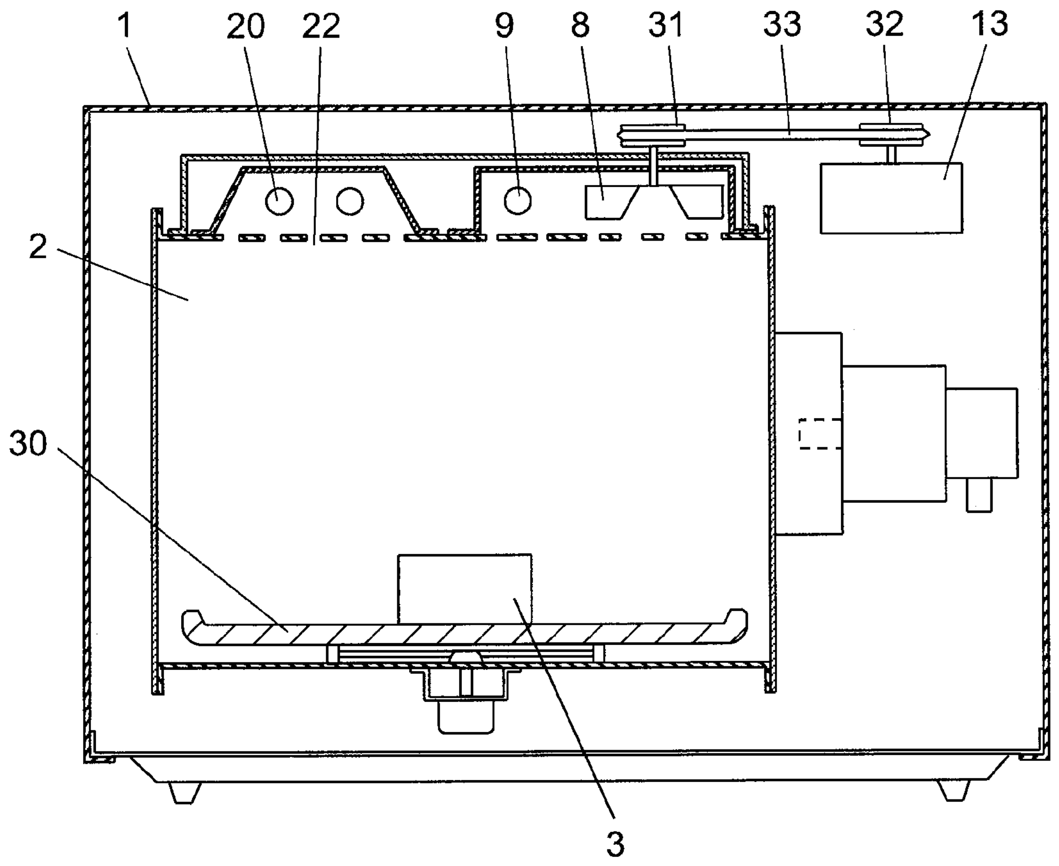
FIG. 3 is a cross sectional view of the same heating device.
Figure 4:
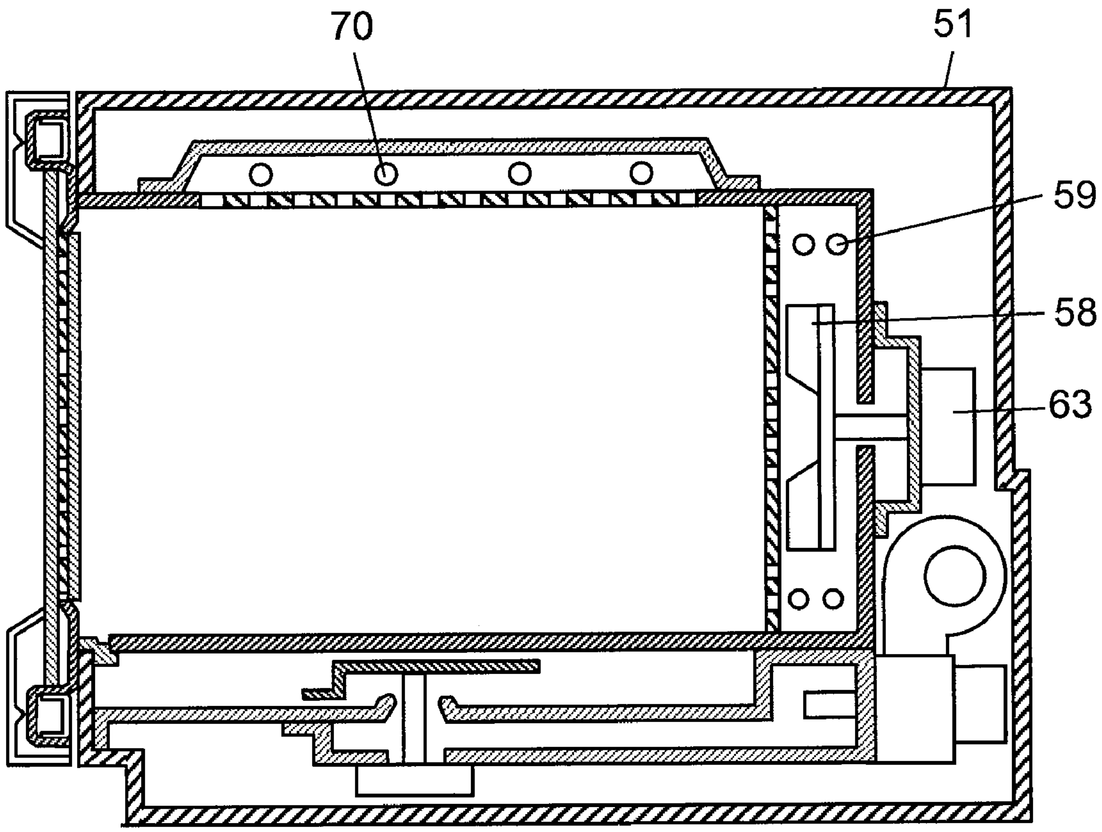
FIG. 4 PRIOR ART
FIG. 4 is a sectional view of a conventional heating device.

FIG. 2 is a top view of a heating device in preferred embodiment 2 of the present invention, and FIG. 3 is a cross sectional view of the same heating device. In preferred embodiment 2 of the present invention, only the points different from preferred embodiment 1 are explained, and same components are identified with same reference numerals, and repeated specific descriptions are omitted.

In an upper part of heating compartment 2, oven heater 9 and circulation fan 8 are disposed. Circulation fan 8 supplies the heat of oven heater 9 into heating compartment 2 as hot air. The heating device of preferred embodiment 2 of the present invention is similar to the cooling device of preferred embodiment 1, and grill heater 20 is disposed obliquely in a part of the upper part of heating compartment 2. Accordingly, heating compartment 2 requires a smaller space for disposing grill heater 20. Therefore, in this widened upper part of heating compartment 2, oven heater 9 and circulation fan 8 can be disposed.

As a result, no space is needed for disposing oven heater 9 or circulation fan 9 in the side wall portion or rear wall portion of heating compartment 2. Hence, the entire heating device is reduced in size, and the heating device can be installed on a narrow counter, and the cooking space in the kitchen or cookroom can be utilized widely.

Drive motor 13 is not disposed coaxially with circulation fan 8. Circulation fan 8 is driven by way of pulley A 31, pulley B 32, and drive belt 33. Herein, pulley A 31 is coupled to circulation fan 8. Pulley B 32 is coupled to drive motor 13. Drive belt 33 is coupled to pulley A 31 and pulley B 32.

In the heating device having such configuration, the operation and the action are explained below.

First of all, the heat generated in oven heater 9 is blown into the inside of heating compartment 2 by way of circulation fan 8 from blow hole 35 provided in the upper part of heating compartment 2. Herein, circulation fan 8 is rotated at high speed by means of drive motor 13. The heat generated in oven heater 9 is supplied to heat object-to-be-heated 3, and is sucked in from suction hole 34 in the center of circulation fan 8, and is blown out into the inside of heating compartment 2. The heating device in preferred embodiment 2 of the present invention composes such hot air circulation system.

The radiation heat radiated from grill heater 20 in the upper part of heating compartment 2 is radiated into the inside of heating compartment 2 by way of radiation hole 22 provided in heating compartment upper wall 21, and heats object-to-be-heated 3.

Turntable 30 for mounting the food in the bottom of heating compartment 2, on which object-to-be-heated 3 is placed, is put into rotation, and the entire surface of object-to-be-heated 3 is heated uniformly if grill heater 20 is disposed obliquely in a part of the upper part of heating compartment 2.

In this manner, in preferred embodiment 2 of the present invention, by rotation of turntable 30 on which object-to-be-heated 3 is placed, if grill heater 20 is disposed obliquely in a part of the upper part of heating compartment 2, object-to-be-heated 3 can be heated entirely and uniformly. Accordingly, object-to-be-heated 3 can be heated entirely and uniformly without disposing a multiplicity of grill heaters 20 in a wide range in the upper part of heating compartment 2. Hence, oven heater 9 and circulation fan 8 can be disposed in an empty space in the upper part of heating compartment 2.

In preferred embodiment 2 of the present invention, drive motor 13 is not disposed coaxially with circulation fan 8. Circulation fan 8 is driven by way of pulley A 31, pulley B 32, and drive belt 33. Hence, heating device main body 1 is reduced in size, and the installation performance on a narrow counter is enhanced, and the cooking space in the kitchen or cookroom can be utilized more widely.

INDUSTRIAL APPLICABILITY

As described herein, the heating device of the present invention is reduced in the size of the heating device main body, and it can be installed on a narrow counter, and the cooking space in the kitchen or cookroom can be utilized widely. Hence, in a convenience store or a fast-food shop not having a large cooking facility, it is usable in an application of a fast heating device capable of presenting foods in various cooking methods using the grill heater, the oven heater, or the high-frequency cooking means.

DESCRIPTION OF REFERENCE MARKS

1 Heating device main body
2 Heating compartment
3 Object-to-be-heated
8 Circulation fan
9 Oven heater

13 Drive motor
15 High-frequency oscillator
17 Side surface
18 Diameter of turntable
20 Grill heater
21 Heating compartment upper wall
22 Radiation hole (punching hole)
30 Turntable
31 Pulley A
32 Pulley B
33 Drive belt
34 Suction hole
35 Blow hole

What is claimed is:

1. A heating device comprising:

a heating compartment that stores an object-to-be-heated inside;

an oven heater configured to heat the heating compartment;

a circulation fan configured to circulate air heated by the oven heater in the heating compartment;

a drive motor configured to drive the circulation fan;

a turntable rotatable with the object-to-be-heated placed thereon, the turntable being located in the heating compartment near a bottom thereof; and a grill heater configured to radiate heat onto the turntable from above the turntable, wherein the grill heater is disposed obliquely to a side surface of the heating compartment and positioned relative to the turntable to avoid overlapping a central part of the turntable.

2. The heating device according to claim 1, wherein a high-frequency oscillator configured to propagate microwave is provided in the heating compartment.

3. The heating device according to claim 1, wherein the grill heater is positioned above a peripheral part of the turntable.

4. The heating device according to claim 1, wherein the grill heater is located above and outside the heating compartment, an upper wall of the heating compartment is formed with radiation holes in order to radiate the heat of the grill heater into the heating compartment, and the radiation holes are formed obliquely in a longitudinal direction of the grill heater.

5. The heating device according to claim 1, wherein the oven heater and the circulation fan are positioned above and outside the heating compartment.

6. The heating device according to claim 5, wherein the drive motor is not disposed coaxially with the circulation fan, and transmits rotation thereof to the circulation fan by means of a belt and pulleys.

* * * * *